(12) United States Patent
Clarke et al.

(10) Patent No.: US 11,694,219 B2
(45) Date of Patent: Jul. 4, 2023

(54) LOCALIZED FACILITY-SPECIFIC PRESENTATION OF DIGITAL TEMPORARY OFFER DATA

(71) Applicant: Quotient Technology Inc., Mountain View, CA (US)

(72) Inventors: Jamie Allan Clarke, Ponte Vedra Beach, FL (US); Stefaan Francois Louis De Waegeniere, Long Island City, NY (US); Xavier Facon, New York, NY (US); Thomas John Limongello, Brooklyn, NY (US); Sharad Kumar Trivedi, Woodbridge, NJ (US); John Garrett Weber, Brooklyn, NY (US)

(73) Assignee: Quotient Technology Inc., Salt Lake City, UT (US)

( * ) Notice: Subject to any disclaimer, the term of this patent is extended or adjusted under 35 U.S.C. 154(b) by 255 days.

(21) Appl. No.: 17/088,344

(22) Filed: Nov. 3, 2020

(65) Prior Publication Data
US 2022/0138793 A1     May 5, 2022

(51) Int. Cl.
*G06Q 30/02* (2023.01)
*G06Q 30/0207* (2023.01)
(Continued)

(52) U.S. Cl.
CPC ..... *G06Q 30/0223* (2013.01); *G06Q 30/0205* (2013.01); *G06Q 30/0219* (2013.01); *G06Q 30/0275* (2013.01)

(58) Field of Classification Search
CPC .............. G06Q 30/02; G06Q 30/0223; G06Q 30/0205; G06Q 30/0219; G06Q 30/0275;
(Continued)

(56) References Cited

U.S. PATENT DOCUMENTS 8,583,477 B2     11/2013   Dodge
10,325,272 B2 *   6/2019   Hunt .................. G06Q 30/0201
(Continued)

FOREIGN PATENT DOCUMENTS

WO     WO 2006/076460 A2     7/2006
WO     WO 2013/052081 A2 *   4/2013   ............. G06Q 30/02
WO     WO 2016/184234 A1 *   4/2013   ............. G06Q 30/02

OTHER PUBLICATIONS

Wang, Jun;Zhang, Weinan; Yuan, Shuai, Display Advertising with Real-Time Bidding (RTB) and Behavioral Targeting (English), Oct. 7, 2016 (Year: 2016).*

(Continued)

*Primary Examiner* — Marilyn G Macasiano
(74) *Attorney, Agent, or Firm* — Baker Botts L.L.P.

(57) ABSTRACT

With an offer server computer system: receiving a first digital image file; receiving a first mapping of product codes to audience segment identifiers; receiving a temporary price reduction offer dataset; mapping a target identifier for an end user device of a consumer to an audience segment identifier; in response to determining, based on the audience segment identifier, that the TPR offer dataset has a product code and a retailer identifier that map to the audience segment identifier, and an effective date value that includes a current date value, and the retailer identifier corresponds to a retailer location within a specified distance of a then-current location of the end user computing device: creating and storing a digital offer dataset comprising both the first digital image file and a second digital image file that presents data elements of the TPR offer dataset; causing transmission of the dataset to the end user device.

21 Claims, 9 Drawing Sheets

(51) Int. Cl.
*G06Q 30/0204* (2023.01)
*G06Q 30/0273* (2023.01)

(58) Field of Classification Search
CPC ........... G06Q 30/0207; G06Q 30/0254; G06Q 10/067; G06Q 30/0246
See application file for complete search history.

(56) References Cited

U.S. PATENT DOCUMENTS

| | | |
|---|---|---|
| 11,257,094 B2* | 2/2022 | Volpi ................. G06Q 30/0255 |
| 2011/0047017 A1 | 2/2011 | Lieblang et al. |
| 2011/0238474 A1 | 9/2011 | Carr et al. |
| 2015/0339703 A1 | 11/2015 | Karlin |
| 2019/0361995 A1 | 11/2019 | Facon |

OTHER PUBLICATIONS

SLADE: A Scalable Low-cost System for Disseminating Targeted Advertisements in Developing Regions (English(United States)) The IP>com Prior Art Database, Feb. 4, 2016 (Year: 2016).*
Extended European Search Report for EP Application No. 21205671.7, dated Mar. 16, 2022, 8 pages.
Marquis, "What Are TPR Sales?", available at https://bizfluent.com/info-10011694-tpr-sales.html, dated Sep. 26, 2017, downloaded Feb. 3, 2021, 14 pages.

* cited by examiner

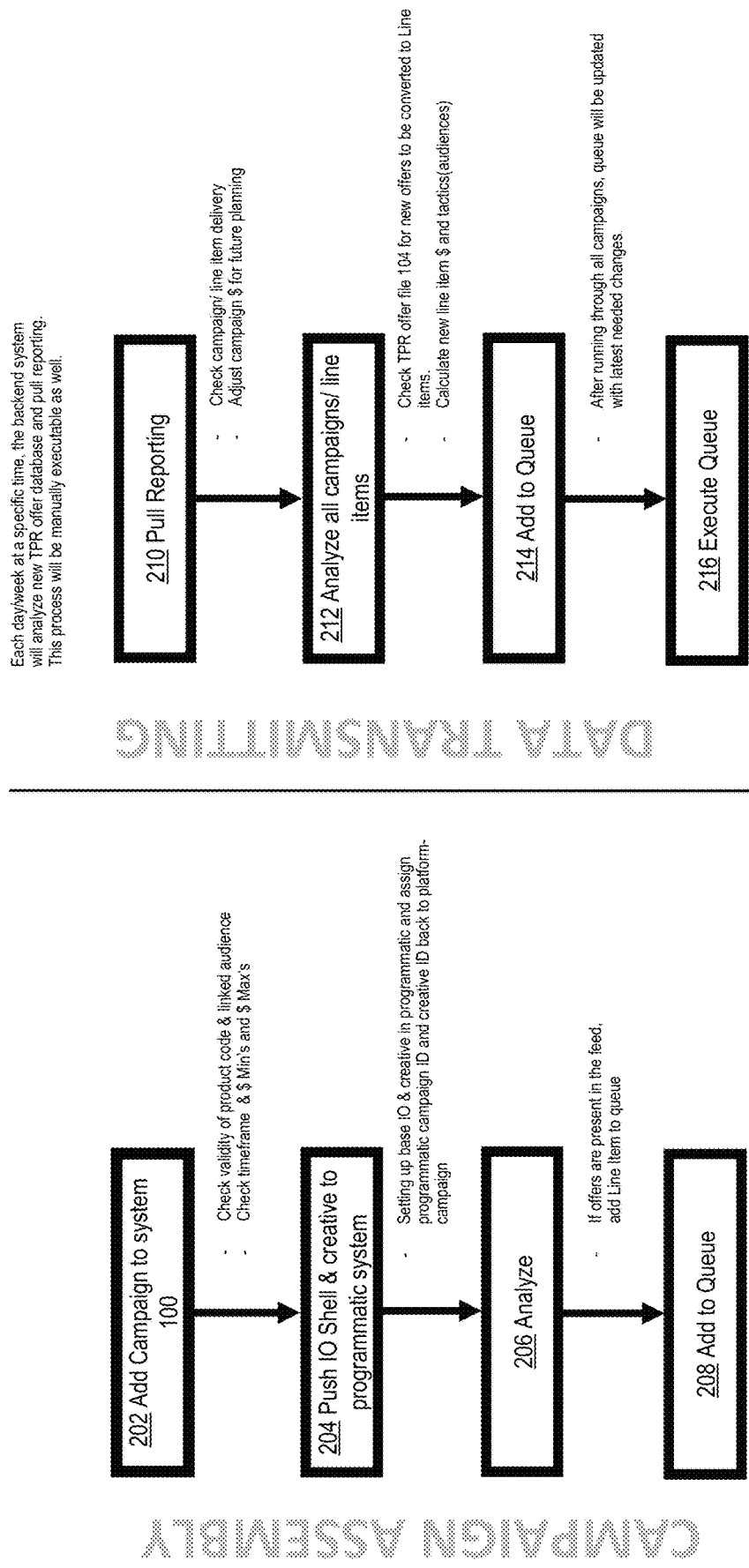

Fig. 3B

Preferred Field Values — 320

| Fields | Campaign Name | UPC(s) | Budget | Start Date | End Date | Estimated weeks | Retailers | Creative Info | URL | Frequency | Status |
|---|---|---|---|---|---|---|---|---|---|---|---|
| Demo Values (322) | 44090 - L123456-1_UnivExports_U PC | 013000006057 | $60,000 | 06/01/2020 | 01/01/2021 | 4 | DraxBuy | https://cdn4.crispadvertsiing.com/12/12/12/image.jpg | https://www.peapod.com/product-search/013000006057 | 5 | Live |
| Info (326) | May be input by user or generated by system, e.g., using incrementing IDs | UPC will immediately be checked for validity with Product Master DB | -Date-check with date picker -Daily/Weekly spend can be calculated based on these 3 values + est.weeks | | | To calculate weekly spends, an estimate of weeks that the offer run | A predefined list of set-up retailers | | Could be derived from UPC by building URL based on offer or Master Product info | Not required but could be added | System optionally programmed to add a campaign as DRAFT, to skip daily analysis. Also flag "Completed" |

Derived Field Values — 330

| Fields | Programmatic ID | Creative ID | Audience ID | Programmatic Geo ID | Daily Budget Estimate | Weekly Budget Estimate | Remaining Budget |
|---|---|---|---|---|---|---|---|
| Demo Values (334) | 12587 | 130674 | 23232323 | 32498231 | $320 | $2,300 | $60,000 |
| Info (336) | Internal programmatic ID returned when campaign shell is created | Internal programmatic ID returned when creative is pushed | Audience Id will be derived from UPC -> May include Manual override | Will be based on the Retailer selected -> May include manual override | Measures how heavy delivery should be | | Value to check for delivery |

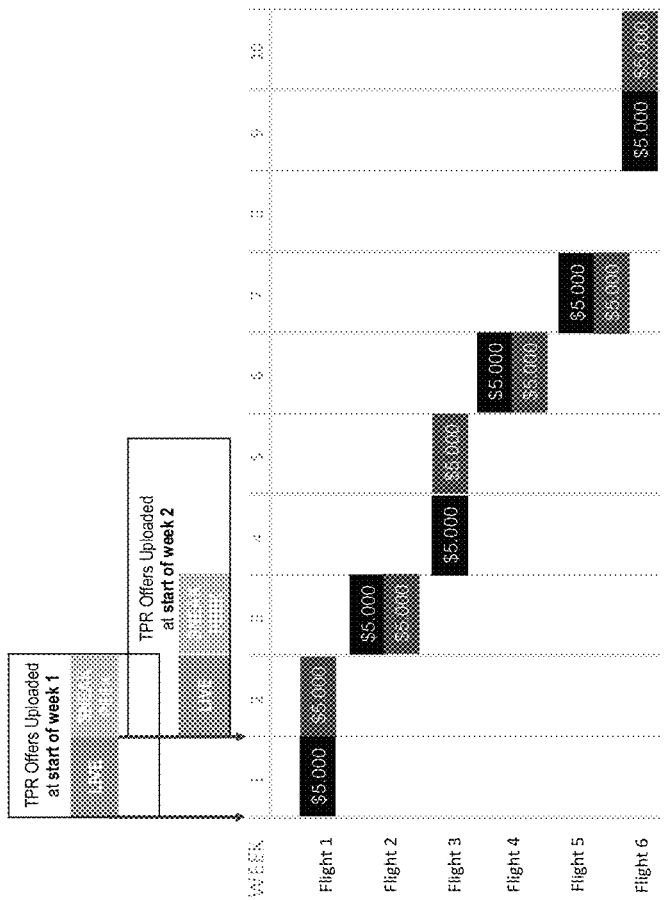

LOCALIZED FACILITY-SPECIFIC PRESENTATION OF DIGITAL TEMPORARY OFFER DATA

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2020 Quotient Technology Inc.

TECHNICAL FIELD

One technical field of the present disclosure is computer-implemented selection and presentation of digital data based upon automatically determined selection criteria. Another technical field is selection and presentation of digital data to mobile computing devices based upon location and time.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In some domains, the vast amount of available digitally stored data poses acute challenges in determining what data to select and present to a particular end user, since human capabilities for managing the data are limited. Large, complex, and feature-rich distributed computer systems and software have been developed to solve the problem of selecting digital data that is relevant to a particular end user, end-user account, or end-user computer that is located in a particular place at a particular time.

For example, advertising technology or adtech is the technical field of storing large datasets relating to products or services available for consumer purchase, receiving orders asserting how to present selected data, selecting a small subset of the data for presentation to a particular end user, end-user account, or end-user computer, and transmitting the selected data. Although adtech indirectly achieves certain business goals, such as inducing consumer purchases of a particular product, the means that are used are purely technical. Deployment of adtech in practical applications to solve data selection and presentation problems has required the practical application of mathematics and computer science to programming of complex distributed computer systems to achieve real-time response, conduct searches of large data repositories, collect digitally stored data, and transform the data into new datasets that have not previously existed.

Some of the data stored in the repositories may concern promotions of a manufacturer when a retailer is making a special offer separate from any promotion or activity of the manufacturer or a brand. As one example, the data stored in the repositories may state or represent temporary price reduction (TPR) offers of manufacturers, sellers, product categories, or brands of consumer packaged goods (CPGs). TPR offers differ from other digital offers in having at least three limitations; they relate to a subset of brands or products; they are offered for a limited time; and they apply to a limited geographical area, typically selected physical or online retail sites. Existing adtech systems are unable to process digital TPR offers or have serious limits in distributing them. There is a need for a fully automated, computer-implemented, scalable system that is capable of selecting and presenting TPR offers to a particular end user, end-user account, or end-user computer, and transmitting the selected offers in real-time in response to a transaction or other event and based upon automatically determined constraints.

SUMMARY

The appended claims may serve as a summary of the invention.

BRIEF DESCRIPTION OF THE DRAWINGS

In the drawings:

FIG. 2 illustrates one embodiment of algorithms for defining and transmitting TPR offers.

FIG. 3B illustrates data values that may serve as input, and may be calculated, to create a campaign in one embodiment.

FIG. 4A illustrates data parameters that may be stored in a campaign definition (FIG. 1) for the specified example.

FIG. 4B graphically illustrates the delivery of flights of TPR offers and the corresponding impact on budget consumption.

DETAILED DESCRIPTION

Figure 1A:
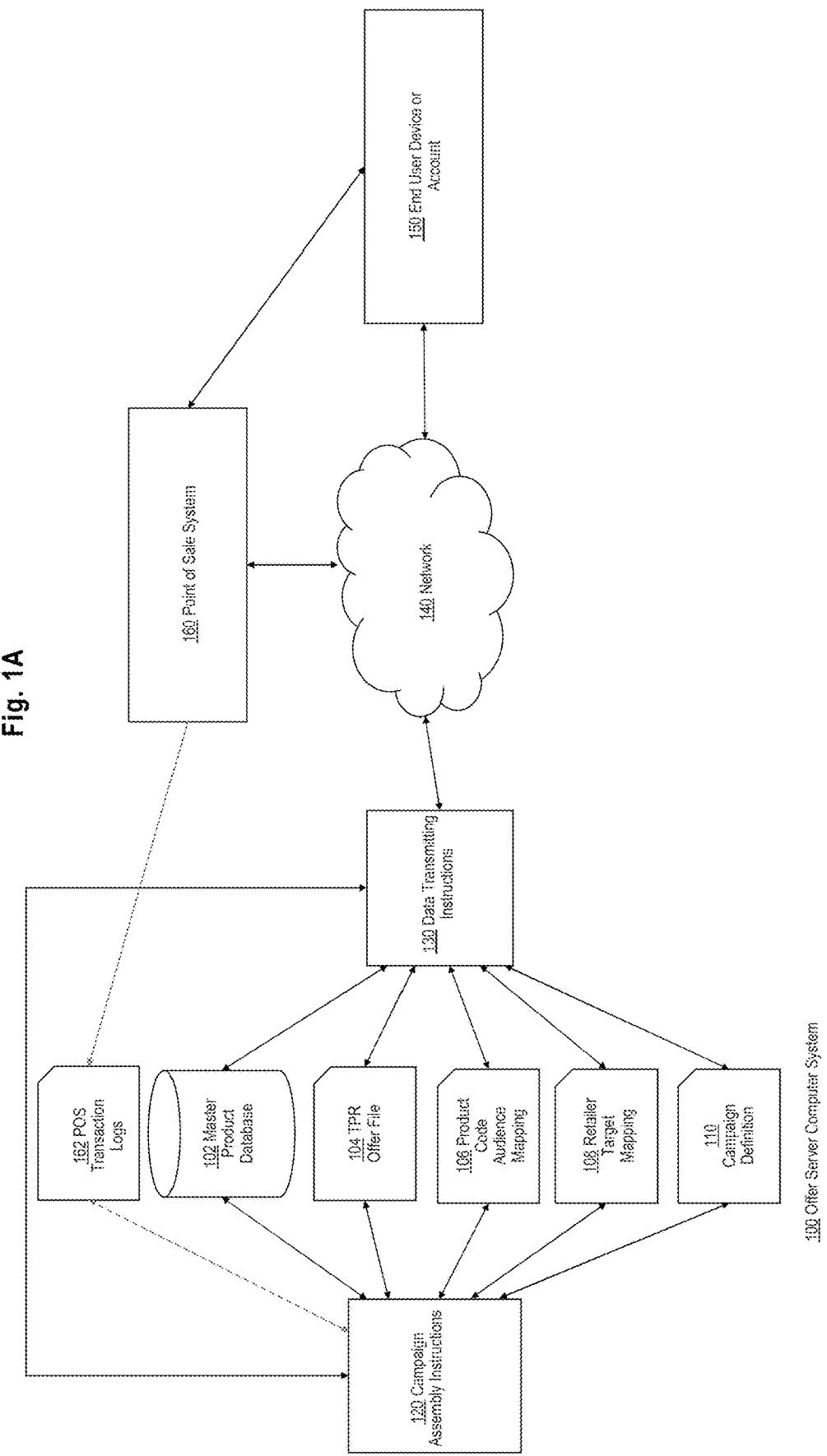
FIG. 1A illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another as a starting point to express algorithms to be programmed or the structure and function of programs to implement the inventions claimed herein.

FIG. 1A, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of TPR offer definition, selection, and transmission. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

Figure 1B:
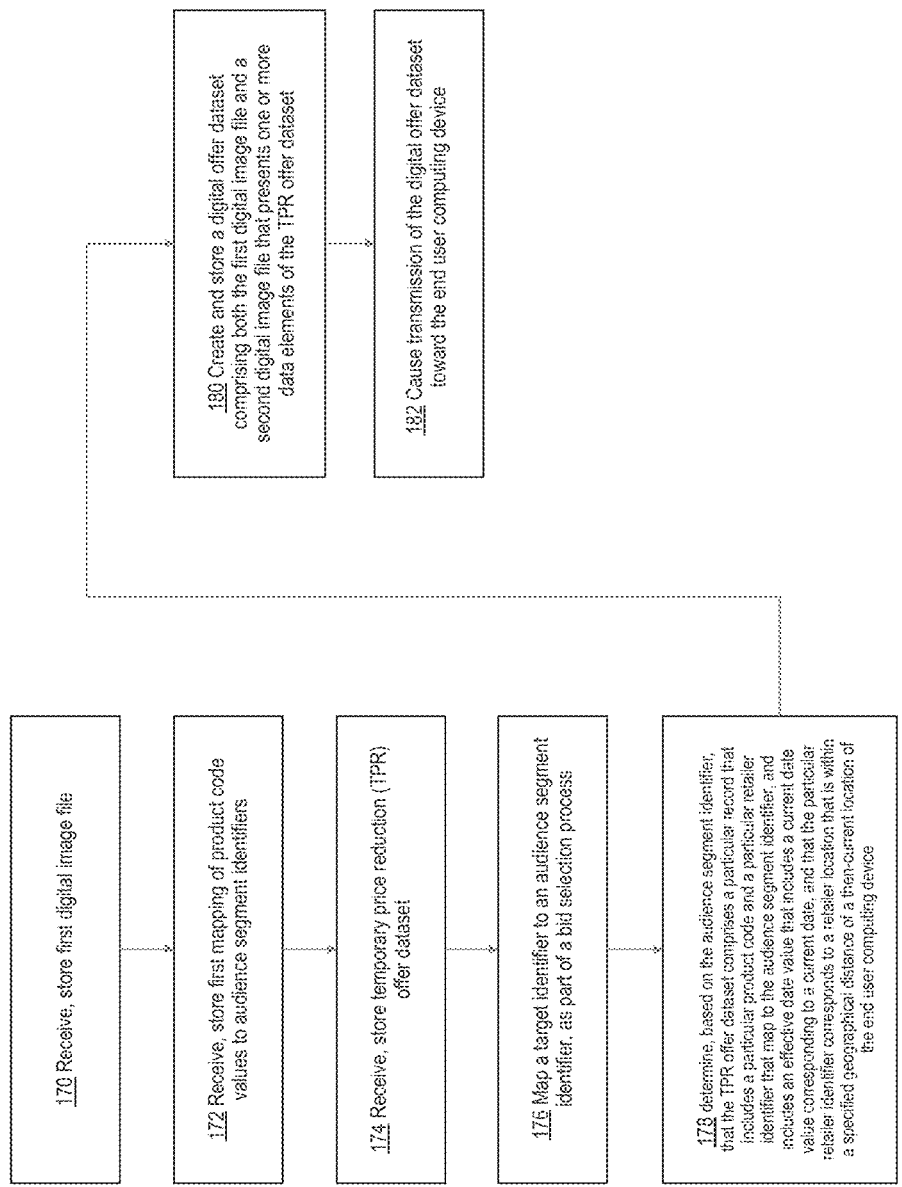
FIG. 1B illustrates one embodiment of a process of selecting and transmitting TPR offers.

FIG. 1B, FIG. 2 and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

Embodiments are described in sections below according to the following outline:
1. General Overview
2. Structural & Functional Overview
   2.1 Example Distributed Computer System
   2.2 Overview of Selecting and Transmitting TPR Offers
   2.3 Campaign Assembly; Ad Serving
3. Implementation Example—Hardware Overview

1. General Overview

In one embodiment, a computer-implemented method comprises, by an offer server computer system: receiving and digitally storing a first digital image file; receiving and digitally storing a first mapping of product codes to audience segment identifiers; receiving and digitally storing a temporary price reduction (TPR) offer dataset; programmatically mapping a target identifier, which is associated with an end user computing device that is associated with a prospective consumer, to an audience segment identifier; in response to determining, based on the audience segment identifier, that the TPR offer dataset comprises a particular record that includes a particular product code and a particular retailer identifier that map to the audience segment identifier, and includes an effective date value that includes a current date value corresponding to a current date, and that the particular retailer identifier corresponds to a retailer location that is within a specified geographical distance of a then-current location of the end user computing device: creating and storing a digital offer dataset comprising both the first digital image file and a second digital image file that presents one or more data elements of the TPR offer dataset; causing transmission of the digital offer dataset toward the end user computing device.

In one feature, the method further comprises receiving device location data specifying a then-current location of the end user computing device and determining that the device location data is within a specified physical radius of a particular retailer that is identified in the TPR offer dataset. In another feature, the method further comprises executing the determining, the creating and storing, and the transmitting only in response to determining that the location data is within a specified geographical radius of a particular retailer having opening hours that include a then-current time of day that is local to the end user computing device. In a further feature, the method comprises executing the determining, the creating and storing, and the transmitting only in response to determining that the location data is within a specified geographical radius of a particular retailer for which local weather conditions match specified conditions of use of the particular product in the TPR offer dataset.

In yet another feature, the audience segment identifiers are generated based on a plurality of digital data received from one or more retailers and identifying particular products that were previously purchased at points of sale in association with purchaser identifiers. In another feature, the TPR offer dataset comprises a plurality of digital records of offers, each of the digital records comprising an association of at least location data specifying a location of a retailer, a start date value and an end date value of an effective period, a product code, and a temporarily reduced price.

In still another feature, the method further comprises reading, from the particular record of the TPR offer dataset, a particular reduced-price value of the particular product; obtaining, from a local retail price data source, a then-current local price value of the same particular product; performing the creating and storing, and the transmitting, only when the particular reduced-price value is less than the then-current local price value. In another feature, the product codes comprise any of UPC values or GTIN values. In yet another feature, the target identifier comprises a loyalty identifier that is obtained at a point of sale computer and transmitted to the offer server computer system.

For purposes of illustrating clear examples, certain sections of this description refer to TPRs and consumer packaged goods. However, the techniques described herein can be used with any form of promotions of a manufacturer when a retailer is making a special offer separate from any promotion or activity of the manufacturer or a brand and the specific use of TPRs or CPGs is not required. Other aspects, features, and embodiments will become apparent from the other description, drawings, and claims of this disclosure.

2. Structural & Functional Overview

2.1 Example Distributed Computer System

FIG. 1A illustrates a distributed computer system showing principal data sources and data flows with which one embodiment could be implemented. In an embodiment, an offer server computer system 100 is coupled directly or indirectly via one or more networks 140 to any number of end-user computing devices 150 and optionally any number of point of sale computers or systems 160. Offer server computer system 100 may be implemented as a single-processor computer, multiple computers, a cluster, and/or one or more virtual computing instances in a private datacenter or a third-party cloud computing system or datacenter.

Digitally stored data sources that support the embodiments described herein generally include a product master database to enable confirming the existence of a particular product; a TPR offer list received from a retailer and specifying product codes, offer time ranges, and product descriptions; a mapping of product codes to product category to an audience identifier; and, in some embodiments, a mapping of retailers to targeting list identifiers for use in demand-side platforms (DSPs).

Accordingly, in one embodiment, the offer server computer system 100 comprises a master product database 102, TPR offer file 104, product code audience mapping 106, retailer target mapping 108, campaign definition 110, campaign assembly instructions 120, data transmitting instructions 130, and optionally POS transaction logs 162. Each of the master product database 102, TPR offer file 104, product code audience mapping 106, retailer target mapping 108, campaign definition 110, and POS transaction logs 162 comprises a digitally stored data in one or more tables, files, mappings, or other digital data structures. Each of the campaign assembly instructions 120 and data transmitting instructions 130 comprises stored program instructions for CPUs or other hardware processors of the offer server computer system 100. In some embodiments, one or more of master product database 102, TPR offer file 104, product code audience mapping 106, retailer target mapping 108, campaign definition 110 may be stored in or managed by other systems to which the offer server computer system 100 is communicatively coupled. For example, the master product database 102 may be part of an external system.

In an embodiment, the master product database 102 is a digital data storage repository that stores records of individual products, such as consumer packaged goods (CPG) items in which a product identifier is a key or column attribute that can be searched using queries or programmatic calls that are submitted to the database. The terms product identifier and product code are interchangeable and examples include Universal Price Code (UPC) values or Global Trade Item Number (GTIN) values. In some embodiments, product identifier or product code may denote a category of products, such as "sporting goods," rather than a specific product. Or, ranges of identifiers or codes may be used. In an embodiment, as further described in other sections, to confirm the validity of a particular product identifier that is identified in a record of the TPR offer file, and for other purposes, one or more of the campaign assembly instructions 120 and data transmitting instructions 130 may be programmed to query the master product database 102 to confirm the existence of the referenced product. In some embodiments, one or more of the campaign assembly instructions 120 and data transmitting instructions 130 may be programmed to, in response to failure to confirm the product identifier in the product code audience mapping 106, to query whether the product identifier exists based on the master product database 102 and to update the product code audience mapping.

In one embodiment, a TPR offer dataset comprising a plurality of digital records of offers, each of the digital records comprising an association of at least location data specifying a location of a retailer, a start date value and an end date value of an effective period of a temporary price reduction, a product identifier for the product subject to a TPR, and a temporarily reduced price value. In an embodiment, TPR offer file 104 comprises a plurality of rows each having column values for product identifiers, offer time range such as start and end dates, a product description suitable for communication to a consumer in an offer, and a sell price. Other embodiments may include other column values or attributes.

The TPR offer file 104 comprises a dataset of records that identify TPR offers that is prepared externally at computers associated with retailers or brands and transmitted over an internetwork to the offer server computer system 100 for local storage and use. The TPR offer file 104 may be received periodically, such as weekly, to replace any prior copy or version of the file.

TPR offer file 104 comprises an association of data that has been unavailable in prior systems. TPR offers usually have a short duration, are different in each retailer, are dependent upon inventory available at the retailer, dependent upon the geography, and have different prices based on any of the foregoing attributes. Using TPR offer files 104 having the data attributes described herein, campaign assembly instructions 120 and data transmitting instructions 130 may be programmed to generate and output digital offer files that specify, at a specific time and place, a reduced price for a specific product that is accurately available at a particular local retailer. Importantly, specific offers can be generated and transmitted only during a specific limited period of time. Furthermore, the resulting digital offer files that can be transmitted to mobile devices are different than previously available ad units or other digital offers because they reflect time-limited TPR offers for specific products and identify a particular retailer, local to the end-user device to which the unit or offer is served, at which the TPR is known to be in effect.

In an embodiment, product code audience mapping 106 comprises a digitally stored association of data that maps product identifiers to product category values to audience identifiers. In an embodiment, the audience identifiers specify an audience segment that has been created and managed in a separate programmatic advertising placement system. A commercial example of the programmatic advertising placement system is UBIMO, but other embodiments may use other demand-side platforms.

In an embodiment, the retailer target mapping 108 comprises a digitally stored association of data that maps retailer identifiers to targeting list identifiers of the programmatic advertising placement system.

In an embodiment, campaign definition 110 is an association of digitally stored values that define instructions to transmit offers to end users, end-user computers or accounts in a specified manner. In this context, a "campaign" may refer to a long-term agreement to request and pay for advertising units defined by digitally stored data specifying products, audience, scale of reach, publishers, timing and frequency, and creative elements. Other embodiments may define a campaign using other sets of stored data elements.

Campaigns may be divided into orders, flights or other sub-units that are effective for shorter periods of time, such as a few weeks, and represented in discrete digital datasets for each unit. In one example, a campaign object or campaign row in the campaign definition 110 comprises a product identifier, a budget value, a time value specifying an estimated number weeks during which the offer is available, a start date and end date, and one or more digital image files or network references such as a URLs specifying one or more digital images to serve in advertising units. In one embodiment, the digital image files comprise both a product image and a retailer image such as a store banner to specifically identify a retailer that is local to the target end user, account, or computer.

Embodiments may be implemented in connection with offers that are primarily associated with retailers and interaction of the elements just described with point of sale computers 160 is not required. However, interoperation with point of sale computers 160 may be useful for measurement purposes and to assess the effectiveness of a campaign, by obtaining POS terminal data to indicate whether a sale associated with an offer actually occurred. Therefore, in some embodiments, POS transaction logs 162 may be received asynchronously with respect to any of the processes described herein from any number of point of sale computers or systems 160. POS transaction logs 162 report basket-level product identifier, for specific products and transactions of end-users as identified by loyalty card identifiers, phone numbers, or other user identifiers that retailers collect voluntarily from end-users or consumers. POS transaction logs 162 provide a basis for mapping loyalty identifiers to audience segment identifiers and thus determine the particular product codes that relate to audience segments identifiers. POS data also may allow a higher level of personalization of offers to buyers.

Network 140 broadly represents one or more local area networks, wide area networks, and/or internetworks using any of terrestrial or satellite, wired or wireless links. Communications over network 140 may use internetworking protocols such as HTTPS over TCP/IP. At the application layer, communications between the functional units of FIG. 1 may use OpenRTB, app-based protocols, and/or parameterized HTTPS.

The end-user computing devices 150 may comprise smartphones, tablet computers, laptop computers, or other computing devices associated with consumer or end-user accounts. Typically an end-user computing device 150 includes one or more wireless transceivers such as GPS receivers, Wi-Fi transceivers or short-distance RF transceivers and location software as part of an app or mobile device operating system that automatically periodically determines a then-current geo-location of the device and transmits location data to specified servers via network 140.

Embodiments of the techniques herein may interoperate with any number of devices 150 based on the computing capacity of the offer server computer system 100 and the bandwidth of network 140. Use of high-capacity computers and high-throughput networks to serve millions of concurrent devices 150 is specifically contemplated and the techniques herein place no limits on the utilization of such devices. For example, offer server computer system 100 may use load balancing routers, multiple app servers, queues, worker threads, and parallelism to achieve higher throughput.

In an embodiment, the offer server computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1A illustrates only one of many possible arrangements of components configured to execute the programming described herein. Other arrangements may include fewer or different components, and the division of work between the components may vary depending on the arrangement.

2.2 Overview of Selecting and Transmitting TPR Offers

FIG. 1B illustrates one embodiment of a process of selecting and transmitting TPR offers. In an embodiment, at block 170, a computer-implemented method executed using an offer server computer system comprises receiving and digitally storing a first digital image file. In one embodiment, a set of static images of CPGs is received and digitally stored for later use in dynamically generated ad units. At block 172, the process is programmed for receiving and digitally storing a first mapping of product codes or product code values to audience segment identifiers.

At block 174, the process is programmed for receiving and digitally storing a temporary price reduction (TPR) offer dataset. In some embodiments, the TPR offer dataset comprises a plurality of digital records of offers, each of the digital records comprising an association of at least location data specifying a location of a retailer, a start date value and an end date value of an effective period, a product identifier, and a temporarily reduced price.

At block 176, the process is programmed for programmatically mapping a target identifier, which is associated with an end user computing device that is associated with a prospective consumer, to an audience segment identifier. Block 176 may be performed, for example, in response to mobile device application, a web browser or other client application, executed at the end user computing device, requests placement of an ad unit within a space in the app or in a web page that has been previously allocated for the placement of an ad unit. As an example, an end-user computing device may be executing a particular retailer's mobile device app which executes an app function to request a promotional offer to display in-app.

Block 176 may form a part of larger, multi-step process of receiving bids for ad placement and determining a winning bid and is not intended to represent all sub steps of a bid request or bid selection process. For example, bid selection can include receiving device location data specifying a then-current location of the end user computing device and determining that the device location data is within a specified physical radius of a particular retailer that is identified in the TPR offer dataset.

At block 178, the process is programmed to determine, based on the audience segment identifier, that the TPR offer dataset comprises a particular record that includes a particular product code and a particular retailer identifier that map to the audience segment identifier, and includes an effective date value that includes a current date value corresponding to a current date, and that the particular retailer identifier corresponds to a retailer location that is within a specified geographical distance of a then-current location of the end user computing device.

In some embodiments, winning bids may be subject to price checks. For example, the process may be programmed for reading, from the particular record of the TPR offer dataset, a particular reduced-price value of the particular product; obtaining, from a local retail price data source, a then-current local price value of the same particular product; performing the creating and storing, and the transmitting, only when the particular reduced-price value is less than the then-current local price value.

Based on the determination of block 178, a dynamic ad unit to offer a TPR may be created. At block 180, in response to block 178, the process is programmed for creating and storing a digital offer dataset comprising both the first digital image file and a second digital image file that presents one or more data elements of the TPR offer dataset. At block 182, the process is programmed further for causing transmission of the digital offer dataset toward the end user computing device. Actual delivery of the ad unit to a display of the end user computing device may involve intermediary ad networks, servers, and the browser. The foregoing process description is intended to explain the principal functions of an inventive solution but not to exhaustively describe every sub step to implement the functions since the skilled audience to which this disclosure is directed will be aware of how to program those sub steps.

Optional functions and features can be implemented in various embodiments. For example, the process can be programmed to execute the previously described determining, creating and storing, and transmitting functions only in response to determining that the location data is within a specified geographical radius of a particular retailer having opening hours that include a then-current time of day that is local to the end user computing device. Or, the process can be programmed to execute the determining, creating and storing, and transmitting only in response to determining that the location data is within a specified geographical radius of a particular retailer for which local weather conditions match specified conditions of use of the particular product in the TPR offer dataset.

Typically, the audience segment identifiers will have been generated before execution of the process just described, based on a plurality of digital data received from one or more retailers and identifying particular products that were previously purchased at points of sale in association with purchaser identifiers. The product codes can be UPC values or GTIN values. The target identifier can be a loyalty identifier that is obtained at a point of sale computer and transmitted to the offer server computer system.

2.3 Campaign Assembly; Ad Serving

As detailed in other sections herein, functional operation of the distributed system of FIG. 1A and the process of FIG. 1B may be organized in two flows or stages comprising a campaign assembly flow and an ad serving flow.

In general, campaign assembly functions as an intake or configuration stage to receive several digital datasets and define campaigns. Each campaign is an organized framework for automatically transmitting digital offers to digital computing devices or accounts according to specified constraints. In an embodiment, campaign assembly comprises periodically receiving a TPR dataset, for example on a weekly basis. Data in the TPR dataset is matched against advertising orders that have been previously stored in an order management system. In response to detecting a match, a minimal campaign dataset or campaign shell is created and stored, in the offer server computer system 100 or in a separate system or sub system that manages programmatic offer delivery. Digital images depicting specific products may be received, retrieved, obtained and stored, alone or in combination based on templates for specific ordering, arrangement and presentation of creative elements of an offer. As a result, a campaign becomes fully populated with the data necessary for serving specific offers or flights and can be marked live in the system. Each campaign typically is associated with a total budget value representing the total available amount for spending on serving ads, and which may be divided into a plurality of per-week budgets for particular calendar weeks of the campaign.

Ad serving constitutes the execution of campaigns to cause transmitting the digital offers when input data at a particular time and place matches campaign data. The ad serving flow may execute, for example, in response to the offer server computer system 100 receiving a request to serve an ad within a web page that is viewed by a particular end-user computing device and that has ad space available. In an embodiment, in general, bid requests for filling the available ad space are transmitted and specify one or more retailer loyalty segment identifiers, which specify audience segments that are associated with loyalty to a particular brand or product code, and that are within a geographical region of retailers at which a TPR for the particular brand or product code is offered. Winning bids result in retrieving data elements such as end-user device identifiers and geo-location identifiers such as lat-long values; these elements are used to determine pricing for the closest retailer, local weather conditions, or other localized values that may constrain whether an offer should be actually presented to a specific end-user device.

If favorable data values are determined to exist, then a particular ad unit is created and transiently stored in computer memory. Creating the particular ad unit may include retrieving a product-specific image from a database coupled to the offer server computer system 100, ordered based on the highest-affinity TPR product for the end user associated with the particular end-user device, retrieving a digital image that identifies a retailer that is local to the particular end-user device, and confirming that the TPR price to be shown in the particular ad unit is actually lower than otherwise locally available for a particular location or retailer. Ad serving in this manner may be repeated until a previously stored budget for a period of the campaign, such as the then-current calendar week, is exhausted. An ad unit is not required to show the TPR price but can specify an offer name, a percentage off, or other data, information or call to action.

FIG. 2 illustrates one embodiment of algorithms for defining and transmitting TPR offers. In an embodiment, FIG. 2 reflects two asynchronous processes comprising a campaign assembly process and a data transmitting process, which may be initiated and executed independently at any time depending on the state of digitally stored data in the system. In an embodiment, campaign assembly instructions 120 may be programmed to execute the campaign assembly process and the data transmitting instructions 130 may be programmed to execute the data transmitting process.

Referring first to the campaign assembly process, in an embodiment, at block 202, a campaign is added to storage of offer server computer system 100 (FIG. 1A). For example, campaign definition 110 is created or received, programmatically or by other data entry. In an embodiment, block 202 is programmed to check the validity of each UPC or GTIN value specified in the campaign definition 110 by forming and transmitting queries to master product database 102 and testing whether a result set of the query is a null set or contains data. Furthermore, block 202 is programmed to test a validity of the timeframe specified in the campaign definition 110 and the validity of the minimum and maximum spend values specified in the definition. For example, the maximum spend value must be greater than the minimum spend value, the minimum spend value must be greater than a threshold system minimum that can be used or placed. Other programmed validity rules may be applied to the data of campaign definition 110. If a validity error is determined, then block 202 may be programmed to generate and transmit a notification, error, or warning, form and store a log file record in a log file, suspend operation of the process, or execute other error modes.

At block 204, digital data for basic elements of an insertion order (IO) are transmitted to the programmatic system. In an embodiment, to create an anchor in the programmatic system to which flights can be pushed later, an API call or other programmatic request is transmitted to the programmatic system to cause creating an empty IO/campaign with minimal information such as name, dates and frequency capacity. Line items are not pushed at this time. Base elements also may include digital image files to be displayed when an offer is presented, dates during which the order is effective, and budget. In an embodiment, a unique campaign identifier is assigned and stored in the programmatic system in response and provided in a response to the process after block 204.

At block 206, an analysis phase is executed comprising reading the TPR offer file 104 and determining whether offers are present in the file that match parameters of a specified campaign definition 110. If one or more matching offers are present, then a line item is formed for each matching offer and queued, at block 208, to a work queue system as further described in connection with FIG. 3A.

Turning now to the data transmitting process of FIG. 2, in an embodiment, on a scheduled periodic basis or when manually invoked, the offer server computer system 100 is programmed to analyze new TPR offer database and pull reporting. At block 210, pull reporting is inspected to check campaign and line item delivery, and to adjust the campaign budget for future planning. Pull reporting can include data obtained from point of sale computers 160 concerning actual transactions and can be assessed using separate computer-implemented processes to search basket-level transaction data and match the data to product codes of campaigns that were run. At block 212, the process is programmed to analyze all campaigns and all line items. The offer database is inspected for new offers to be converted to line items. A line item budget is calculated for each and tactics or audiences are determined.

At block 214, newly created line items are added to the queue. Thus, after inspecting all configured campaigns, the queue is updated with the latest changes that are needed. At block 216, the queue is executed.

Figure 3A:
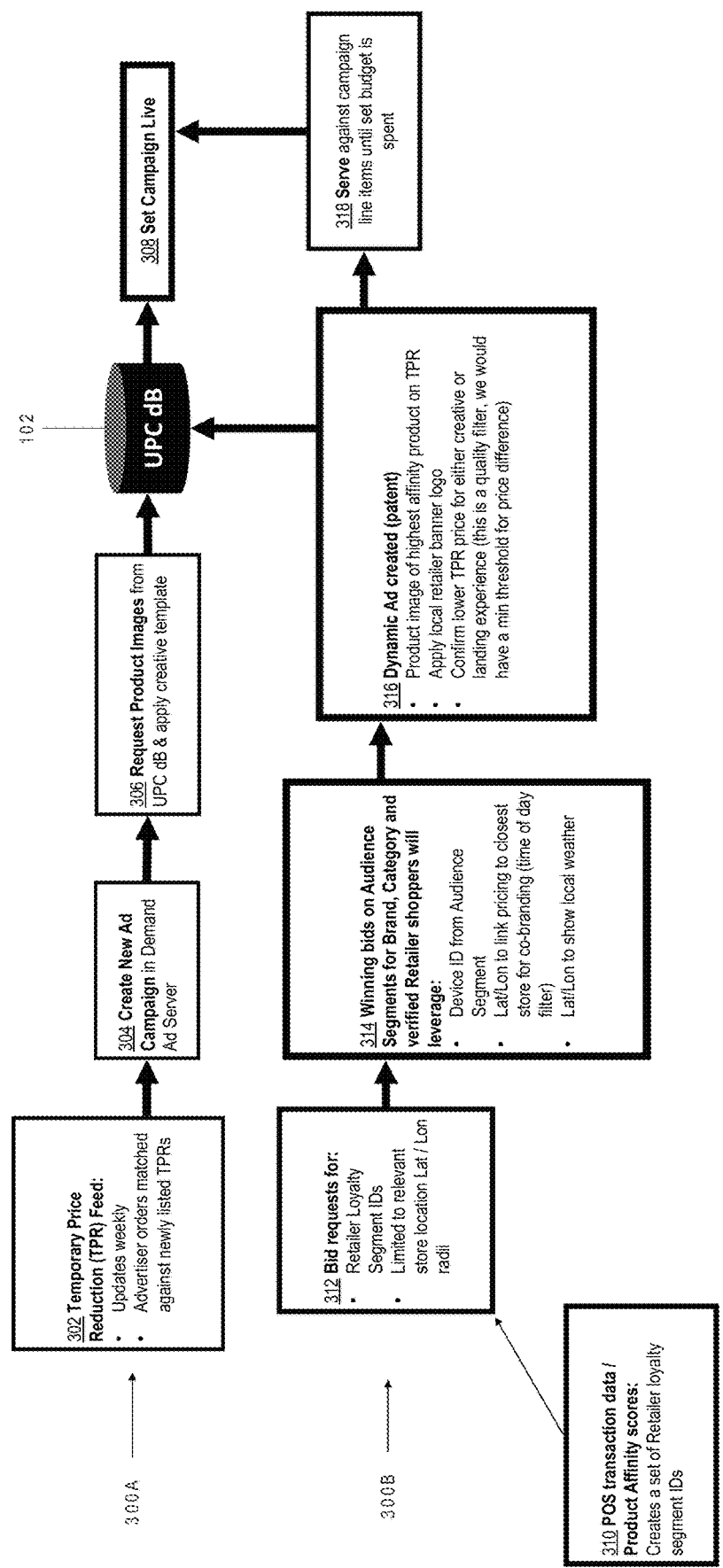
FIG. 3A illustrates further details of a campaign assembly algorithm and ad serving algorithm, according to one embodiment.

FIG. 3A illustrates further details of a campaign assembly algorithm and ad serving algorithm, according to one embodiment. FIG. 3A shows, for one embodiment, a campaign configuration process 300A and an ad placement process 300B. Referring first to process 300A, in an embodiment, at block 302, a TPR data feed is received on a periodic basis. For example, the offer server computer system 100 (FIG. 1) is programmed to receive TPR offer file 104 periodically and, in response, to match advertiser orders against one or more newly listed TPR records in the offer file.

At block 304, in response, a new ad campaign is created in a demand ad server or DSP platform such as the programmatic system discussed in connection with FIG. 2. FIG. 3B illustrates data values that may serve as input, and may be calculated, to create a campaign in one embodiment.

FIG. 3B illustrates a first table 320 that summarizes preferred field values for input to create a campaign, and a second table 330 that specifies field values that may be derived, under stored program control, or obtained from other systems or input. In an embodiment, first table 320 comprises a first row 322 that specifies labels of data fields or attributes; the same labels may be used as column names, attribute names, or variable names in programming an embodiment or configuring the schema of the database 102. A second row 324 specifies example values for an example that is also referenced in other sections herein. A third row 326 describes optional programming of offer server computer system 100 that may be implemented in one or more embodiments.

Second table 330 similarly comprises a first row 332 that specifies labels of data fields or attributes; the same labels may be used as column names, attribute names, or variable names in programming an embodiment or configuring the schema of the database 102. A second row 334 specifies example values for an example that is also referenced in other sections herein. A third row 336 describes optional programming of offer server computer system 100 that may be implemented in one or more embodiments.

At block 306, the process is programmed to request one or more product image files from a database, such as master product database 102 (FIG. 1) or another repositor of UPC product data, and to apply a creative template to the image files. The result is a completed campaign capable of placement or delivery, which is marked as live in the programmatic system at block 308.

Process 300B is described next. In an embodiment, before process 300B initiates execution, at block 310, consumer point-of-sale (POS) transaction data and product affinity score data is received from third-party sources, analyzed and formed as a set of retailer loyalty segment identifiers. In general, the retailer loyalty segment identifiers specify attributes of consumers who may be interested in particular products or brands based upon past actual purchases at retail points of sale. The POS transaction data provides specific product identifiers from a basket of purchased products with a loyalty card identifier or a device identifier that is associated with the consumer.

At block 312, one or more advertisement bid requests are received. In an embodiment, bid requests conform to message protocols defined as part of OpenRTB Real-time Bidding (RTB) and specifically include a retailer loyalty segment identifier value and one or more location values. In an embodiment, location values are specified as latitude-longitude (lat/long) values and a radius value.

At block 314, in real time in response to a request to place a digital offer in a particular resource, such as a web page, app, or other digital facility, the process is programmed to determine one or more winning bids on audience segments for a particular brand, category, and verified retail shoppers. When a winning bid is selected, and data elements of the winning bid match a campaign or flight that has been formed based on the TPR offer file 104 in the campaign assembly process, then at block 316 a dynamic ad unit will be formed to include a TPR offer.

In an embodiment, calculating the winning bid is based in part on obtaining a device identifier from the audience segment information, the lat/long values for the purpose of linking pricing to the closed store for co-branding, and using the lat/long values to retrieve third-party weather data. For example, the product identified in a TPR record must be relevant to a given audience segment for a winning bid to be declared. The bid must include location data to enable verifying that the price of a given product at a local retailer is not lower than the TPR for the same geo-location specified in records of TPR offer file 104.

Thus, in an embodiment, a winning bid should have high location accuracy because useful offer of a TPR should reference local retailer that actually is offering the TPR for a specified product. In some cases, values that constrain or affect bids to win may be derived or obtained from other systems and do not appear in the bid request. For example, mappings 106, 108 may enrich a bid and these values and sources may influence the calculation of a winning bid according to several different programmed rules.

For example, a TPR record could specify a brand of outdoor cooking charcoal as having reduced prices because the brand owner knew at the time of forming the TPR offer file 104 that local weather had been poor for several days, and the lat/long values and third-party weather data may indicate that the shopper's device is within a location for which rain is forecast or occurring. In such a case, programmed rules may bias the winning bid calculation against that TPR record.

Time of day data for the shopper device's location also may bias the calculation. For example, if the time of day at the shopper device's location is 7:00 pm and based on the lat/long values the closest retailer to the shopper device location is closed at that hour, then the programmed rules may bias the winning bid calculation against that TPR record. Weather and time of day values also may be used to alter the appearance of a dynamic ad unit at block 316, for example, by rendering the ad unit using darker colors if the current time is night, adding summer theme graphical elements if the weather is hot, and so forth.

Applying the programmed rules will result in identifying one or more winning bids. In response, at block 316, in real time, a set of digital offer or advertising data is automatically created and stored in memory, forming a dynamically generated digital advertisement. In an embodiment, block 316 is programmed to select and use a digital image file for the highest affinity product that is associated with a TPR, and to use a banner or other digital image associated with the closest local retailer that sells the product subject to the TPR.

Further, in an embodiment, block 316 is programmed to confirm that the TPR price is materially lower than the average price for the product at the closest local retailer. This programmed rule is intended to prevent creation and presentation of offers where, for example, the TPR price of a product is minimally less than the current available regular price for the item at the closest retailer. The specific mechanism for confirming that a TPR price is lower is not critical. As an example, the process could receive and store a separate digital file that specifies undiscounted current pricing for a set of items and retailers, or calculates average price for a particular product across several retailers, and block 316 could be programmed to match the item of the dynamic offer to the records in the separate digital file and to compare price values.

In an embodiment, the dynamic offer that was created at block 316 is served, at block 318, as part of the selected campaign line items until the set budget is expended.

An example of placement is now provided involving two (2) UPC values and a single unified budget. Assume that the brand Universal Exports has contracted with an operator of offer server computer system 100 to advertise upcoming promotions for two (2) stock keeping units (SKUs) of underwater cameras in all DraxBuy stores throughout the upcoming ten weeks, knowing that the UPCs and offers will only be live for six of the ten weeks, with a budget of $60,000. FIG. 4A illustrates data parameters that may be stored in campaign definition 110 (FIG. 1) for the specified example.

In an embodiment, each week, a new TPR offer list is uploaded to offer server computer system 100 as TPR offer file 104. Since the campaign is using a combined budget pool and estimated weeks allocation, flight budgets are equally divided and calculated as $60,000 DIV 2 UPCs DIV 6 weeks each=$5,000 per flight per UPC. Each week, data transmitting instructions 130 automatically push the flights to the programmatic system until the budget has been depleted. FIG. 4B graphically illustrates the delivery of flights of TPR offers and the corresponding impact on budget consumption. The budget for a line item may be calculated as:

$$LI\ Budget = \frac{(Total\ Budget - Spent\ Budget)}{(Estimated\ Weeks - Line\ Item\ Count\ Live)}$$

Figure 3C:
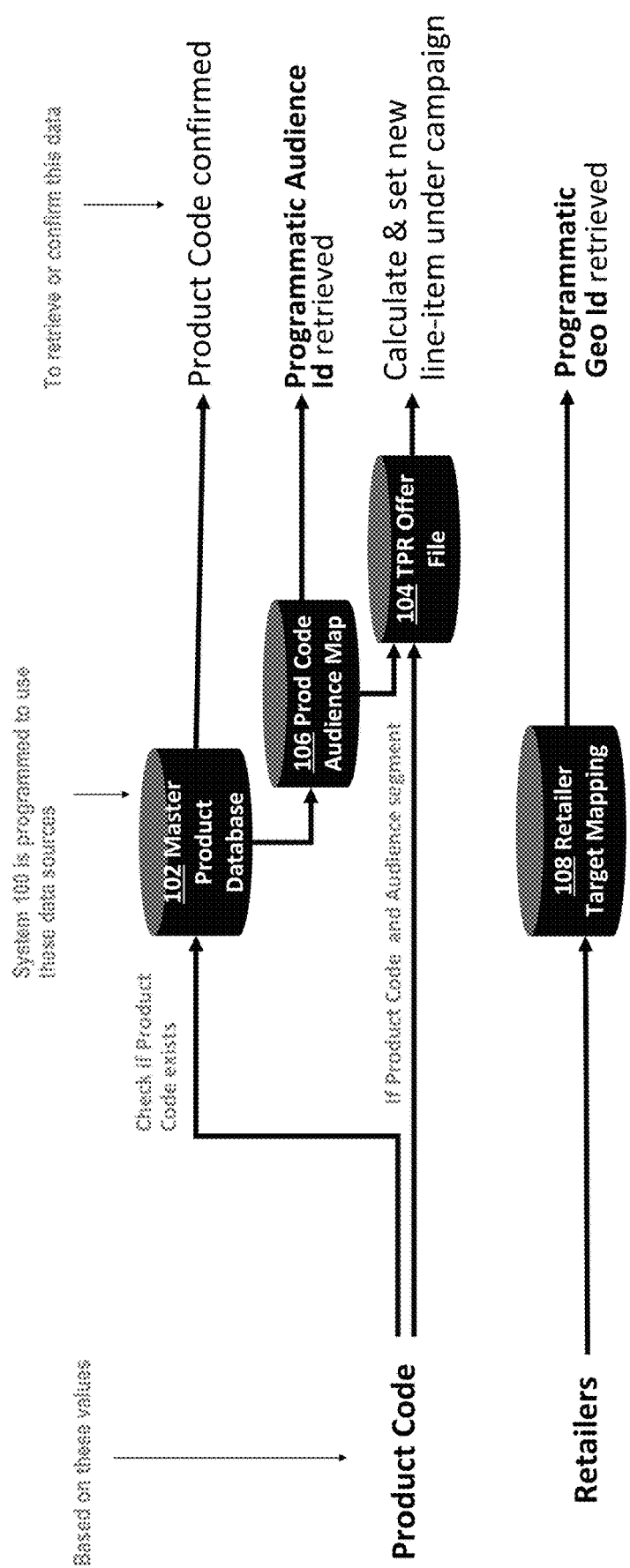
FIG. 3C illustrates the interoperation of the databases, files and mappings shown in FIG. 1 at different stages of processing as described above.

FIG. 3C illustrates the interoperation of the databases, files and mappings shown in FIG. 1 at different stages of processing as described above. For example, offer server computer system 100 may be programmed to receive a product code value such as a UPC or GTIN value as input, then query the master product database 102 to determine if the product code value exists; if a result set is received that is not null, then the product code is confirmed, and a return value or other programmatic response may be passed to other elements of the system. Or, if both a product code and audience segment value are received, then the product code may be validated as just described, and the product code audience mapping 106 may be used to retrieve a valid programmatic audience ID, then compared to the TPR offer file 104 to calculate and set a new line item under a campaign.

Further, if a retailer ID is received, then offer server computer system 100 may be programmed to use retailer target mapping 108 to yield a programmatic geographic identifier for use in location comparisons as previously described.

Unlike prior techniques, the ad units that are created and transmitted in the foregoing manner may be closely adapted to local retailers based on audience segment identifier and the geography of the available retailers and the geo-location the target end-user device. Winning bids for ads comprise accurate location values that correspond to the geo-location data of at least one record in the TPR data file 104 for a region containing retailers at which the TPR is offered or available. Ad units are compiled using not only a digital image of a specific product subject to the TPR as identified in the TPR data file, but a further digital image that identifies a particular retailer that offers the TPR and is local to the end-user computing device to which the ad unit is delivered. Furthermore, a particular TPR price may be included in the ad unit and is confirmed as a significantly or materially lower price than an average or typical price for the same product within the same geography as the retailer to be featured.

In an embodiment, one main Promo Amplification Advertiser data object is created and defined in the programmatic system noted above, for each Retailer group, to enable reporting on performance or delivery in a flexible manner. Each campaign results in creating one insertion order (IO) in the programmatic system. Each UPC ad unit is pushed as a separate creative in the programmatic system. Further, for each product code and each unit of advertising delivery, termed a flight, a corresponding line item is created in the programmatic system. Each line item has multiple tactics assigned for delivery; examples include, and are not limited to, audience segments and geo-targeting.

In an embodiment, after the IO has been pushed to the programmatic system, campaign assembly instructions 120 are programmed to upload a creative tag for each product code that is identified in a campaign. Each such creative push comprises an engagement tag, a plurality of digital image files, optional associated data, and version identifiers. Examples of digital images that could be concurrently transmitted as part of a push may include a basic creative image, network links or URLs to be associated with particular image versions, images with specific TPR messages, and a campaign identifier. Alternative digital images may be used to enable better adaptation to different geographic locations or to permit customization of ad units for particular audience segments or brand identities.

Figure 5:
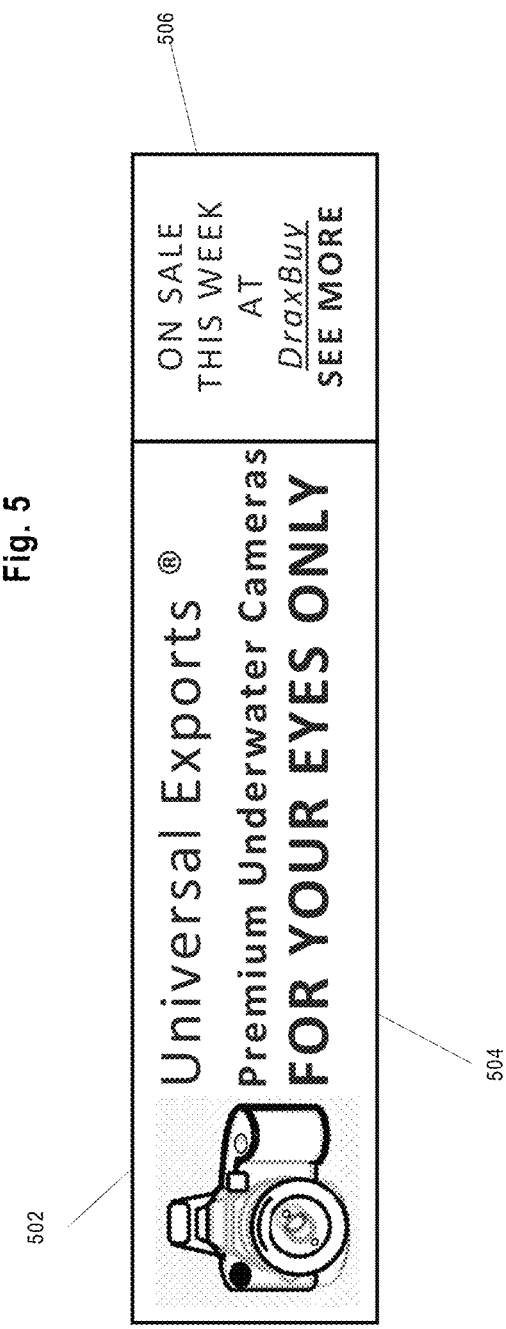
FIG. 5 illustrates an example set of digital images that may be used in an embodiment.

FIG. 5 illustrates an example set of digital images that may be used in an embodiment. For the example of FIG. 5, a set of pushed creative 502 comprises a basic creative image 504 and a second image 506 with a specific TPR message. In one embodiment, a CPG or brand forms the basic creative image 504 and transmits it offline to the offer server computer system 100. In an embodiment, multiple different copies of second image 506 may be associated in the same creative push and may specify different retailers, slogans, or other content, and may be associated with different URLs for consumer action. The IO and creative identifiers may be stored in master product database 102 or another database for reference in other steps. In various embodiments, creative 502 may include images and copy for the product, the retailer's banner logo and a suggestion that the product is currently on price promotion.

The creative 502 may include a hyperlink such that computer input, such as a tap or click, on the ad banner is programmed to cause showing the product's promotional price and type (e.g. certain amount off one product, BOGO, etc.) directly on the first page of the landing experience on the retailer's website. In some embodiments, input on an ad unit may be programmed to cause, on a receiving server, activation of other offers, loyalty points, rebates, or other benefits in response to the end-user driving to a store, using a shopping list or store locator, or adding an item to an online shopping cart.

The embodiments thus described provide numerous technical benefits in comparison to past techniques. The distributed computer systems and programmed processes described herein enable computers associated with CPG brands to transmit instructions for temporary price reductions that are read, interpreted, and applied to generate dynamic digital offers to end-user devices within a specified geography and time. Prior systems have been unable to process, form, or transmit offers with these parameters and constraints.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
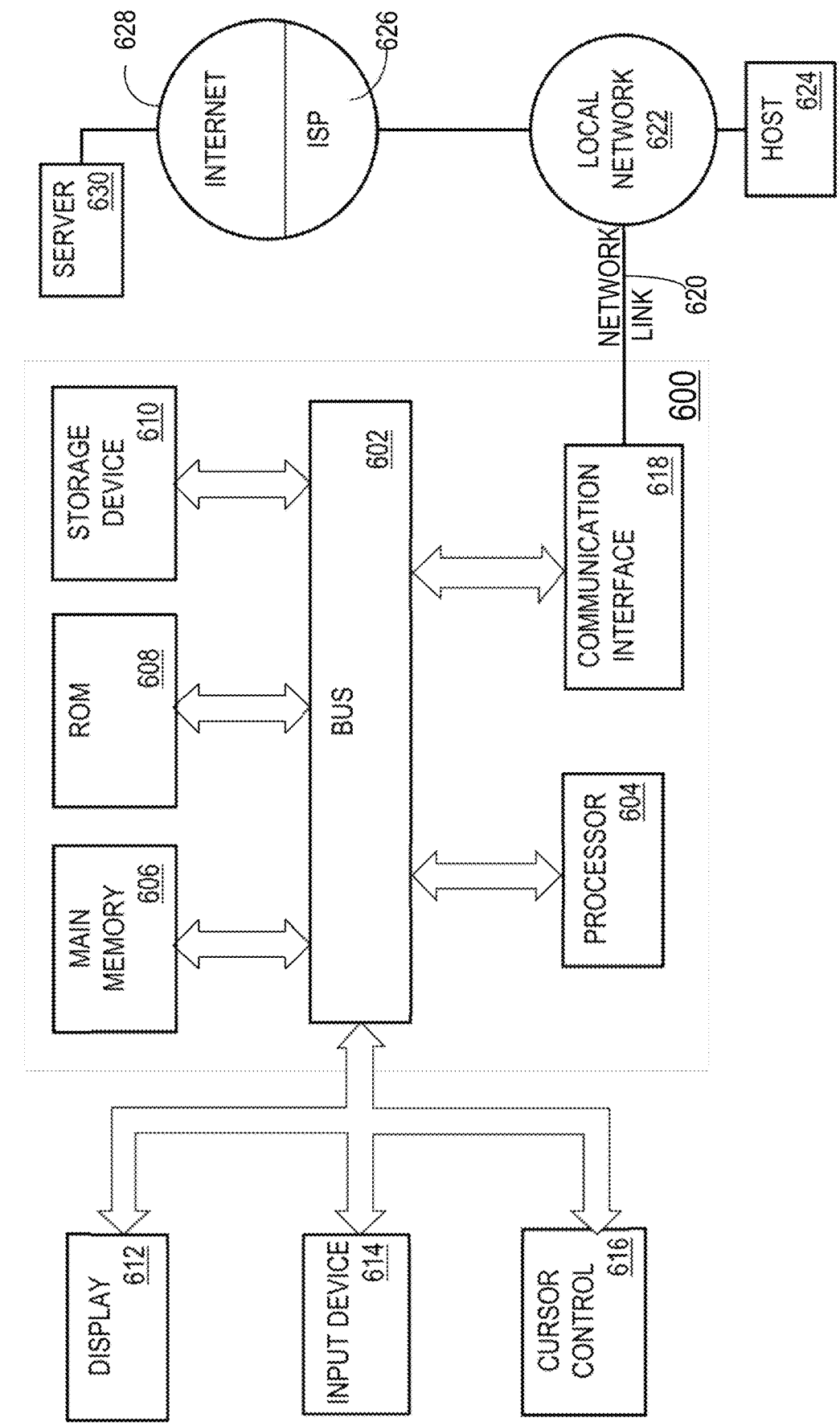
FIG. 6 illustrates a computer system with which one embodiment could be implemented.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to a format that can be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to bus 602. Communication interface 618 provides a two-way data communication coupling to network link(s) 620 that are directly or indirectly connected to at least one communication networks, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, internetwork or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through a network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server computer 630 may be coupled to internet 628. Server 630 broadly represents any computer, data center, virtual machine or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer and data storage layer such as a relational database system using structured query language (SQL) or no SQL, an object store, a graph database, a flat file system or other data storage.

Computer system 600 can send messages and receive data and instructions, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A computer-implemented method, comprising:
by an offer server computer system:

receiving and digitally storing a first digital image file, a first mapping of product codes to audience segment identifiers, and a first temporary price reduction (TPR) offer dataset;

periodically receiving a second TPR offer dataset;

in response to the receiving, replacing the first TPR offer dataset with the second TPR offer dataset;

programmatically mapping a target identifier, which is associated with an end user computing device that is associated with a prospective consumer, to an audience segment identifier; and in response to determining, based on the audience segment identifier, that the first TPR offer dataset comprises a particular record that includes a particular product code and a particular retailer identifier that map to the audience segment identifier, and includes an effective date value that includes a current date value corresponding to a current date:

creating and storing a digital offer dataset comprising both the first digital image file and a second digital image file, where the second digital image file corresponds to the particular retailer identifier.

2. The computer-implemented method of claim 1, further comprising receiving device location data of the end user computing device and determining that the device location data identifies a location that is within a specified physical radius of the particular retailer identifier; and causing transmission of the digital offer dataset toward the end user computing device.

3. The computer-implemented method of claim 2, further comprising receiving a store operating hours data set that relates to the particular retailer identifier, where the store operating hours data set specifies operating hours;

determining a then-current time of day that corresponds to the particular retailer identifier; and executing the determining, the creating and storing, and the transmitting only in response to further determining that the then-current time of day is within the operating hours.

4. The computer-implemented method of claim 2, further comprising receiving a local weather conditions data set, where the local weather condition data set relates to the particular retailer identifier; and executing the determining, the creating and storing, and the transmitting only in response to further determining that the local weather conditions data set match specified conditions of use of the particular product in the first TPR offer dataset.

5. The computer-implemented method of claim 1, the audience segment identifiers having been generated based on a plurality of digital data received from one or more retailers and identifying particular products that were previously purchased at points of sale in association with purchaser identifiers.

6. The computer-implemented method of claim 1, the first TPR offer dataset comprising a plurality of digital records of offers, each of the digital records comprising an association of at least location data specifying a location of a retailer, a start date value and an end date value of an effective period, a product code, and a temporarily reduced price.

7. The computer-implemented method of claim 1, further comprising:

reading, from the particular record of the first TPR offer dataset, a particular reduced-price value of the particular product;

obtaining, from a local retail price data source, a then-current local price value of the same particular product;

performing the creating and storing, and the transmitting, only when the particular reduced-price value is less than the then-current local price value.

8. The computer-implemented method of claim 1, the product codes comprising any of UPC values or GTIN values.

9. The computer-implemented method of claim 1, the target identifier comprising a loyalty identifier that is obtained at a point of sale computer and transmitted to the offer server computer system.

10. A computer-implemented method, comprising:

by an offer server computer system:

receiving and digitally storing a first temporary price reduction (TPR) offer dataset, a plurality of first digital image files comprising digital images of products that are identified in the TPR offer dataset, and a plurality of advertising units based on the first digital image files;

periodically receiving a second TPR offer dataset;

in response to the receiving, replacing the first TPR offer dataset with the second TPR offer dataset;

receiving and digitally storing a first mapping of product codes to audience segment identifiers;

programmatically receiving a plurality of bid requests, each of the bid requests specifying a retailer loyalty segment identifier and geo-location data;

selecting a winning bid from among the plurality of bid requests based on programmatically mapping a target identifier, which is associated with an end user computing device that is associated with a prospective consumer, to an audience segment identifier and determining, based on the audience segment identifier, that the first TPR offer dataset comprises a particular record that includes a particular product code and a particular retailer identifier that map to the audience segment identifier, and includes an effective date value that includes a current date value corresponding to a current date, and that the particular retailer identifier corresponds to a retailer location that is within a specified geographical distance of a then-current location of the end user computing device;

based on the winning bid request, creating and storing a digital offer dataset comprising both the first digital image file and a second digital image file that corresponds to the retailer location that is within the specified geographical distance of the then-current location of the end user computing device, and causing transmission of the digital offer dataset toward the end user computing device.

11. The computer-implemented method of claim 10, further comprising receiving device location data specifying a then-current location of the end user computing device and determining that the device location data is within a specified physical radius of a particular retailer that is identified in the first TPR offer dataset.

12. The computer-implemented method of claim 11, further comprising executing the determining, the creating and storing, and the transmitting only in response to determining that the location data is within a specified geographical radius of a particular retailer having opening hours that include a then-current time of day that is local to the end user computing device.

13. The computer-implemented method of claim 11, further comprising executing the determining, the creating and storing, and the transmitting only in response to determining that the location data is within a specified geographical radius of a particular retailer for which local weather conditions match specified conditions of use of the particular product in the first TPR offer dataset.

14. The computer-implemented method of claim 10, the audience segment identifiers having been generated based on a plurality of digital data received from one or more retailers and identifying particular products that were previously purchased at points of sale in association with purchaser identifiers.

15. The computer-implemented method of claim 10, the first TPR offer dataset comprising a plurality of digital records of offers, each of the digital records comprising an association of at least location data specifying a location of a retailer, a start date value and an end date value of an effective period, a product code, and a temporarily reduced price.

16. The computer-implemented method of claim 1, further comprising:
reading, from the particular record of the first TPR offer dataset, a particular reduced-price value of the particular product;
obtaining, from a local retail price data source, a then-current local price value of the same particular product;
performing the creating and storing, and the transmitting, only when the particular reduced-price value is less than the then-current local price value.

17. The computer-implemented method of claim 10, the product codes comprising any of UPC values or GTIN values.

18. The computer-implemented method of claim 10, the target identifier comprising a loyalty identifier that is obtained at a point of sale computer and transmitted to the offer server computer system.

19. A computer-implemented method, comprising:
by an offer server computer system:
receiving and digitally storing a first temporary price reduction (TPR) offer dataset, a plurality of first digital image files comprising digital images of products that are identified in the first TPR offer dataset, and a plurality of advertising units based on the first digital image files, the first TPR offer dataset comprising a plurality of digital records of offers, each of the digital records comprising an association of at least location data specifying a location of a retailer, a start date value and an end date value of an effective period, a product code comprising any of UPC values or GTIN values, and a temporarily reduced price;
periodically receiving a second TPR offer dataset;
in response to the receiving, replacing the first TPR offer dataset with the second TPR offer dataset;
receiving and digitally storing a first mapping of product codes to audience segment identifiers;
programmatically receiving a plurality of bid requests, each of the bid requests specifying a retailer loyalty segment identifier and geo-location data;
receiving device location data specifying a then-current location of the end user computing device and determining that the device location data is within a specified physical radius of a particular retailer that is identified in the first TPR offer dataset;
selecting a winning bid from among the plurality of bid requests based on programmatically mapping a target identifier, which is associated with an end user computing device that is associated with a prospective consumer, to an audience segment identifier and determining, based on the audience segment identifier, that the first TPR offer dataset comprises a particular record that includes a particular product code and a particular retailer identifier that map to the audience segment identifier, and includes an effective date value that includes a current date value corresponding to a current date, and that the particular retailer identifier corresponds to a retailer location that is within a specified geographical distance of a then-current location of the end user computing device;
the audience segment identifiers having been generated based on a plurality of digital data received from one or more retailers and identifying particular products that were previously purchased at points of sale in association with purchaser identifiers;
based on the winning bid request, creating and storing a digital offer dataset comprising both the first digital image file and a second digital image file that corresponds to the retailer location that is within the specified geographical distance of the then-current location of the end user computing device, and causing transmission of the digital offer dataset toward the end user computing device.

20. The computer-implemented method of claim 19, further comprising executing the determining, the creating and storing, and the transmitting only in response to determining that the location data is within a specified geographical radius of a particular retailer having opening hours that include a then-current time of day that is local to the end user computing device or only in response to determining that the location data is within a specified geographical radius of a particular retailer for which local weather conditions match specified conditions of use of the particular product in the first TPR offer dataset.

21. The computer-implemented method of claim 19, further comprising:
reading, from the particular record of the first TPR offer dataset, a particular reduced-price value of the particular product;
obtaining, from a local retail price data source, a then-current local price value of the same particular product;
performing the creating and storing, and the transmitting, only when the particular reduced-price value is less than the then-current local price value.

* * * * *